US010931713B1

(12) United States Patent
Allam et al.

(10) Patent No.: US 10,931,713 B1
(45) Date of Patent: Feb. 23, 2021

(54) PASSIVE DETECTION OF GENUINE WEB BROWSERS BASED ON SECURITY PARAMETERS

(71) Applicant: Cequence Security, Inc., Sunnyvale, CA (US)

(72) Inventors: Bhasker R. Allam, Fremont, CA (US); Shreyans Mehta, Los Altos, CA (US); Seiji C. Armstrong, Mountain View, CA (US)

(73) Assignee: Cequence Security, Inc., Sunnyvale, CA (US)

( * ) Notice: Subject to any disclaimer, the term of this patent is extended or adjusted under 35 U.S.C. 154(b) by 91 days.

(21) Appl. No.: 15/435,718

(22) Filed: Feb. 17, 2017

Related U.S. Application Data

(60) Provisional application No. 62/296,174, filed on Feb. 17, 2016.

(51) Int. Cl.
*H04L 29/06* (2006.01)
*H04L 9/32* (2006.01)

(52) U.S. Cl.
CPC ........ *H04L 63/1483* (2013.01); *H04L 9/3247* (2013.01); *H04L 63/14* (2013.01); *H04L 63/1408* (2013.01)

(58) Field of Classification Search
CPC .. H04L 63/14; H04L 63/1408; H04L 63/1483
See application file for complete search history.

(56) References Cited

U.S. PATENT DOCUMENTS

| 7,380,708 | B1 | 6/2008 | Kiliccote | |
| 7,784,099 | B2 | 8/2010 | Benjamin | |
| 7,814,542 | B1 | 10/2010 | Day | |
| 8,244,799 | B1 * | 8/2012 | Salusky | H04L 63/1416 709/203 |

(Continued)

FOREIGN PATENT DOCUMENTS

| JP | 2007-208861 A | 8/2007 |
| JP | 2008-508805 A | 3/2008 |

(Continued)

OTHER PUBLICATIONS

Takahiro Hamada, Yuminobu Igarashi, Hideo Kitazume, Network System for Home Network Security in Cloud, IEICE Technical Report, the Institute of Electronics, Information and Communication Engineers, Sep. 4, 2014, vol. 114, No. 207, p. 105-110.

*Primary Examiner* — Daniel B Potratz

(57) ABSTRACT

Techniques to facilitate passive detection of forged web browsers are disclosed herein. In at least one implementation, security information transmitted by a client during Hypertext Transfer Protocol Secure (HTTPS) session establishment between a web server and the client is monitored, and header information transmitted by the client is processed to determine a type of web browser associated with the client. A security signature for the client is generated based on the security information transmitted by the client during the HTTPS session establishment. The security signature for the client is compared with a predetermined signature for the type of web browser associated with the client to determine if the client is a genuine web browser of the type of web browser associated with the client.

20 Claims, 6 Drawing Sheets

(56) References Cited

U.S. PATENT DOCUMENTS

| | | |
|---|---|---|
| 8,307,099 B1 | 11/2012 | Khanna et al. |
| 8,646,081 B1 | 2/2014 | Xue et al. |
| 8,819,819 B1 | 8/2014 | Johnston et al. |
| 8,856,869 B1 | 10/2014 | Brinskelle |
| 8,893,270 B1 | 11/2014 | Yang et al. |
| 9,231,964 B2 | 1/2016 | Cross et al. |
| 9,348,742 B1 | 5/2016 | Brezinski |
| 9,485,262 B1 | 11/2016 | Kahn et al. |
| 9,646,140 B2 | 5/2017 | Horadan |
| 9,749,305 B1* | 8/2017 | Sharifi Mehr ........ G06F 21/606 |
| 10,291,589 B1* | 5/2019 | Sharifi Mehr ...... H04L 63/0428 |
| 2004/0098609 A1 | 5/2004 | Bracewell et al. |
| 2005/0063377 A1 | 3/2005 | Bryant et al. |
| 2006/0031680 A1 | 2/2006 | Maiman |
| 2006/0117386 A1 | 6/2006 | Gupta et al. |
| 2007/0005648 A1 | 1/2007 | Armanino et al. |
| 2008/0005782 A1 | 1/2008 | Aziz |
| 2008/0162679 A1 | 7/2008 | Maher et al. |
| 2008/0229109 A1 | 9/2008 | Gantman et al. |
| 2010/0125900 A1 | 5/2010 | Dennerline et al. |
| 2010/0169476 A1 | 7/2010 | Chandrashekar et al. |
| 2010/0191972 A1 | 7/2010 | Kiliccote |
| 2011/0013527 A1 | 1/2011 | Varadarajan et al. |
| 2011/0239300 A1 | 9/2011 | Klein et al. |
| 2011/0269437 A1 | 11/2011 | Marusi et al. |
| 2011/0283361 A1 | 11/2011 | Perdisci et al. |
| 2012/0144026 A1 | 6/2012 | Conlon et al. |
| 2012/0240185 A1 | 9/2012 | Kapoor et al. |
| 2012/0291129 A1* | 11/2012 | Shulman ............. H04L 63/1433 726/23 |
| 2013/0031621 A1 | 1/2013 | Jenne et al. |
| 2013/0036472 A1 | 2/2013 | Aziz |
| 2013/0055375 A1 | 2/2013 | Cline et al. |
| 2013/0097699 A1 | 4/2013 | Balupari et al. |
| 2013/0195457 A1 | 8/2013 | Levy et al. |
| 2013/0227674 A1 | 8/2013 | Anderson |
| 2013/0315241 A1 | 11/2013 | Kamat et al. |
| 2014/0101764 A1 | 4/2014 | Montoro |
| 2014/0189864 A1 | 7/2014 | Wang et al. |
| 2015/0067472 A1* | 3/2015 | Chen ................... G06F 16/9577 715/234 |
| 2015/0096023 A1 | 4/2015 | Mesdaq et al. |
| 2015/0180893 A1 | 6/2015 | Im et al. |
| 2016/0110549 A1 | 4/2016 | Schmitt |
| 2016/0149953 A1 | 5/2016 | Hidayat |
| 2016/0173526 A1 | 6/2016 | Kasman et al. |
| 2016/0197947 A1 | 7/2016 | Im et al. |
| 2016/0241592 A1 | 8/2016 | Kurkure et al. |
| 2016/0308898 A1 | 10/2016 | Teeple et al. |
| 2017/0041334 A1 | 2/2017 | Kahn et al. |
| 2017/0078328 A1* | 3/2017 | McGinnity ......... H04L 63/0281 |
| 2017/0134397 A1 | 5/2017 | Dennison et al. |
| 2018/0026999 A1 | 1/2018 | Ruvio et al. |
| 2018/0115571 A1 | 4/2018 | Kahn et al. |

FOREIGN PATENT DOCUMENTS

| | | |
|---|---|---|
| JP | 2011-503715 A | 1/2011 |
| WO | WO2014/021863 | 2/2014 |
| WO | WO2014/042645 | 3/2014 |

* cited by examiner

EXEMPLARY SECURITY PARAMETERS FROM A MODERN WEB BROWSER

- Ciphersuite: ECDHE-RSA-AES128-GCM-SHA256:ECDHE-ECDSA-AES128-GCM-SHA256:ECDHE-RSA-AES256-GCM-SHA384:ECDHE-ECDSA-AES256-GCM-SHA384:DHE-RSA-AES128-GCM-SHA256:DHE-DSS-AES128-GCM-SHA256:kEDH+AESGCM:ECDHE-RSA-AES128-SHA256:ECDHE-ECDSA-AES128-SHA256:ECDHE-RSA-AES128-SHA:ECDHE-ECDSA-AES128-SHA:ECDHE-RSA-AES256-SHA384:ECDHE-ECDSA-AES256-SHA384:ECDHE-RSA-AES256-SHA:ECDHE-ECDSA-AES256-SHA:DHE-RSA-AES128-SHA256:DHE-RSA-AES128-SHA:DHE-DSS-AES128-SHA256:DHE-RSA-AES256-SHA256:DHE-DSS-AES256-SHA:DHE-RSA-AES256-SHA:!aNULL:!eNULL:!EXPORT:!DES:!RC4:!3DES:!MD5:!PSK
- Versions: TLSv1.1, TLSv1.2
- RSA key size: 2048
- DH Parameter size: 2048
- Elliptic curves: secp256r1, secp384r1, secp521r1 (at a minimum)
- Certificate signature: SHA-256
- HSTS: max-age=15724800

FIGURE 4

EXEMPLARY SECURITY PARAMETERS FROM AN OLDER WEB BROWSER

- Ciphersuite: ECDHE-RSA-AES128-GCM-SHA256:ECDHE-ECDSA-AES128-GCM-SHA256:ECDHE-RSA-AES256-GCM-SHA384:ECDHE-ECDSA-AES256-GCM-SHA384:DHE-RSA-AES128-GCM-SHA256:DHE-DSS-AES128-GCM-SHA256:kEDH+AESGCM:ECDHE-RSA-AES128-SHA256:ECDHE-ECDSA-AES128-SHA256:ECDHE-RSA-AES128-SHA:ECDHE-ECDSA-AES128-SHA:ECDHE-RSA-AES256-SHA384:ECDHE-ECDSA-AES256-SHA384:ECDHE-RSA-AES256-SHA:ECDHE-ECDSA-AES256-SHA:DHE-RSA-AES128-SHA256:DHE-RSA-AES128-SHA:DHE-DSS-AES128-SHA256:DHE-RSA-AES256-SHA256:DHE-DSS-AES256-SHA:DHE-RSA-AES256-SHA:ECDHE-RSA-DES-CBC3-SHA:ECDHE-ECDSA-DES-CBC3-SHA:AES128-GCM-SHA256:AES256-GCM-SHA384:AES128-SHA256:AES256-SHA256:AES128-SHA:AES256-SHA:AES:CAMELLIA:DES-CBC3-SHA:!aNULL:!eNULL:!EXPORT:!DES:!RC4:!MD5:!PSK:!aECDH:!EDH-DSS-DES-CBC3-SHA:!EDH-RSA-DES-CBC3-SHA:!KRB5-DES-CBC3-SHA
- Versions: TLSv1, TLSv1.1, TLSv1.2
- RSA key size: 2048
- DH Parameter size: 2048
- Elliptic curves: secp256r1, secp384r1, secp521r1 (at a minimum)
- Certificate signature: SHA-256

FIGURE 5

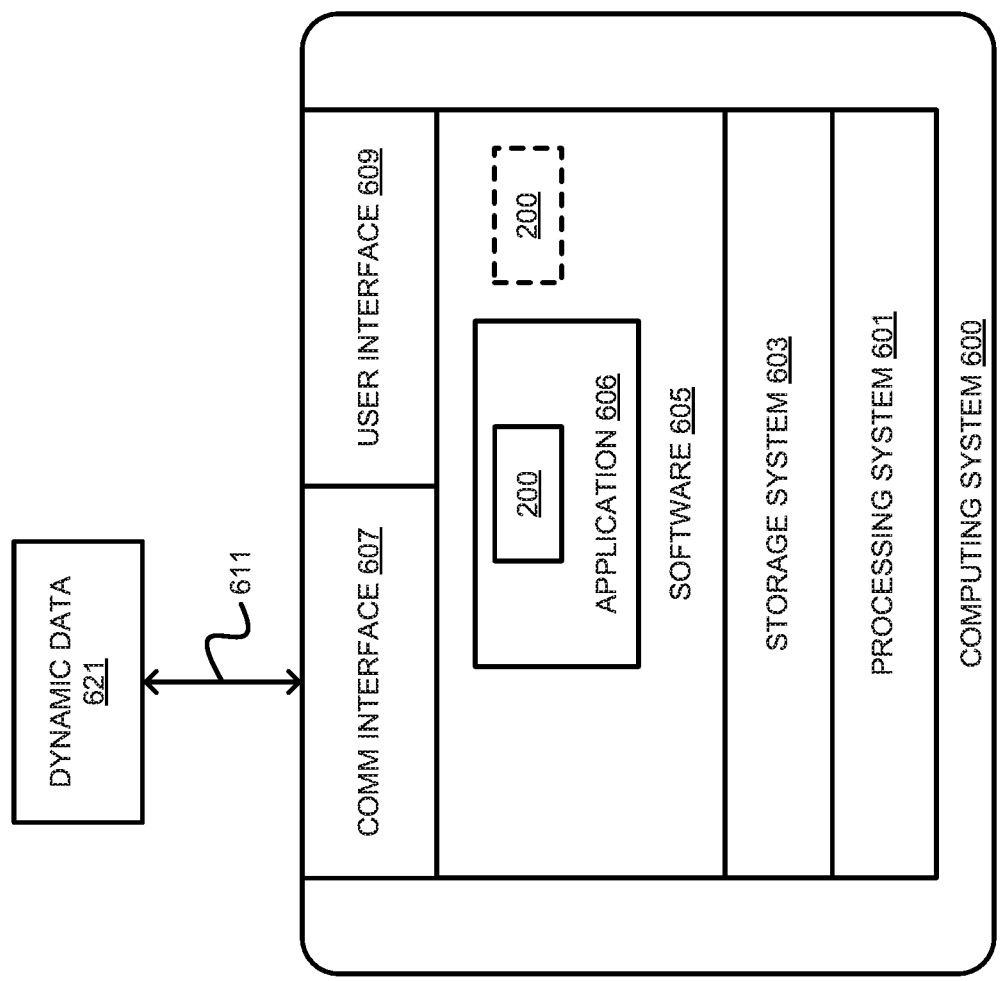

PASSIVE DETECTION OF GENUINE WEB BROWSERS BASED ON SECURITY PARAMETERS

RELATED APPLICATIONS

This application claims the benefit of, and priority to, U.S. Provisional Patent Application No. 62/296,174, entitled "PASSIVE DETECTION OF GENUINE WEB BROWSERS BASED ON SECURITY PARAMETERS", filed Feb. 17, 2016, which is hereby incorporated by reference in its entirety for all purposes.

TECHNICAL BACKGROUND

Various kinds of automated attacks are possible on web servers that provide web services, such as using stolen credentials to fraudulently access the service, velocity attacks, brute-force login attacks that try several username and password combinations to gain access, registering fake accounts, scraping websites to harvest web data, and others. Such velocity attacks typically require a large number of transactions with the web service in a very short period of time, and commonly-used web browsers are prohibitively slow for such large-scale and high-speed transactions. Instead, attackers use a wide variety of attack tools, ranging from simple shell scripts to sophisticated custom tools designed to speed up transactions.

Unfortunately, attack tools are often designed to deceive a web service into believing that the traffic is actually originating from a prevalent web browser. To achieve this subterfuge, the User-Agent header of a well-known browser may be forged in the hypertext transfer protocol (HTTP) request header of traffic originating from a malicious attack tool. Because the User-Agent string exactly matches one of the well-known web browsers, the web service and any attack-prevention techniques that rely on identifying the User-Agent string are unable to differentiate between a real web browser and a forgery, leaving the web service vulnerable to exploitation by malicious individuals employing attack tools to access the service.

OVERVIEW

A method to facilitate passive detection of forged web browsers is disclosed. The method comprises monitoring security information transmitted by a client during Hypertext Transfer Protocol Secure (HTTPS) session establishment between a web server and the client. The method further comprises processing header information transmitted by the client to determine a type of web browser associated with the client. The method further comprises generating a security signature for the client based on the security information transmitted by the client during the HTTPS session establishment. The method further comprises comparing the security signature for the client with a predetermined signature for the type of web browser associated with the client to determine if the client is a genuine web browser of the type of web browser associated with the client.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

FIG. 4 illustrates exemplary security parameters from modern web browsers.

FIG. 5 illustrates exemplary security parameters from older web browsers.

FIG. 6 is a block diagram that illustrates a computing system.

DETAILED DESCRIPTION

Figure 1:
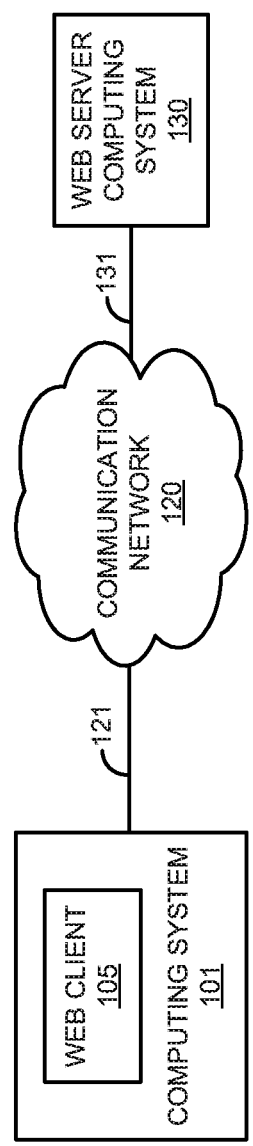
FIG. 1 is a block diagram that illustrates a communication system.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Some security technologies detect a forged browser by actively injecting JavaScript code or modifying the pages being served by the web service as part of the web server's response to client requests. The web server can then use the results of the JavaScript execution to determine whether or not the client making the requests is actually a genuine web browser. However, this technique relies on integration within the web service or inline deployment with the web service which may require additional development on the web service and can affect web service performance due to active modification of the pages being served. The following disclosure enables passive detection of genuine or forged web browser activity without any active page modification.

Implementations are disclosed herein to facilitate passive detection of forged web browsers. In at least one implementation, Hypertext Transfer Protocol Secure (HTTPS) session establishment between a web server and a client system is monitored. During the HTTPS session establishment, the client transfers a 'client hello' message to the web server, which typically includes a list of cipher suites and other security parameters. The web server also receives header information transmitted by the client which is processed by the web server to determine a type of web browser that the client purports to be, and the web server also generates a security signature for the client based on the list of cipher suites transmitted by the client. For example, the number of cipher suites in the list, the order of the cipher suites, and other attributes of the security parameters and information exchanged between the web client and the web server to establish the secure communication channel can be used to generate the security signature for the browser for identification purposes. This information can in turn be used to classify traffic belonging to a genuine web browser versus a forged browser or attack tool attempting to emulate a real browser using automation. In at least one implementation, the security signature for the client is compared with a predetermined and known signature for the type of web browser that the client lists in its header information to determine whether the client is a genuine or forged web browser.

Referring now to FIG. 1, a block diagram of communication system 100 is illustrated. Communication system 100 includes computing system 101, communication network 120, and web server computing system 130. Computing system 101 include web client 105. Computing system 101 and communication network 120 communicate over communication link 121. Communication network 120 and web server computing system 130 are in communication over communication link 131.

Figure 2:
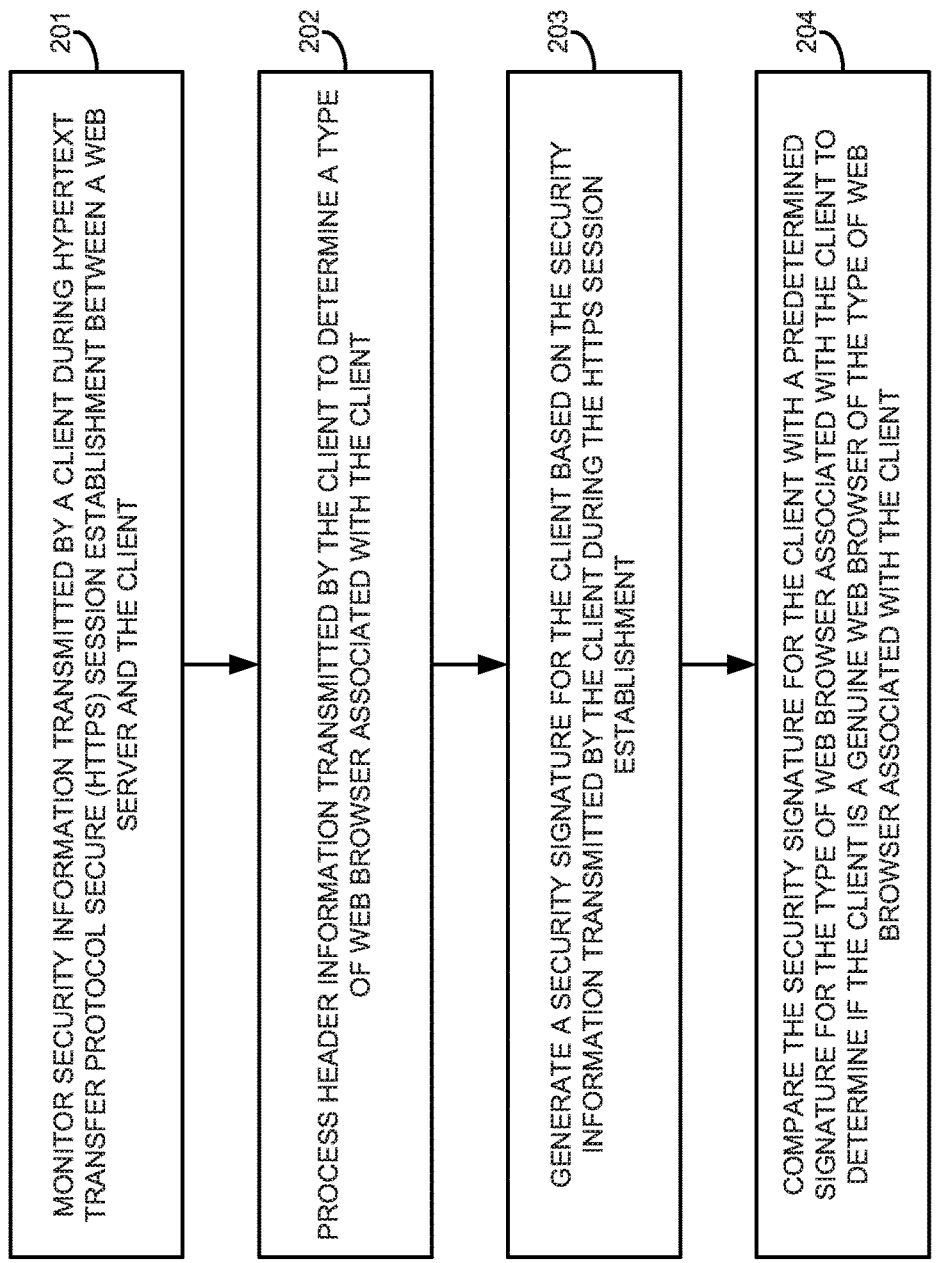
FIG. 2 is a flow diagram that illustrates an operation of the communication system.

FIG. 2 is a flow diagram that illustrates an operation 200 of communication system 100. The operation 200 shown in FIG. 2 may also be referred to as detection process 200 herein. The steps of the operation are indicated below parenthetically. The following discussion of operation 200 will proceed with reference to web client 105 and web server 130 of FIG. 1 in order to illustrate its operations, but note that the details provided in FIG. 1 are merely exemplary and not intended to limit the scope of process 200 to the specific implementation shown in FIG. 1.

Operation 200 may be employed to facilitate passive detection of forged web browsers. Operation 200 may be performed by web server 130, such as according to a security software module installed on web server 130, or could be executed by any other computing system or device in communication with web server 130, including distributed over many separate processing systems in diverse geographic locations. For example, operation 200 may be performed by an active inline security device configured to intercept network traffic en route to its final destination, which could be web server 130, another computing system, a cloud server, a mobile application server, an API flow, or any other computing resource. Alternatively, operation 200 may be performed by passive security systems of web server 130 that perform deep analysis on a copy of the network traffic, such as a test access point (TAP) or switch port analyzer (SPAN) port. A TAP port is a passive splitting mechanism that utilizes separate dedicated channels to transmit and receive a copy of a network data stream to a monitoring device in real time, whereas a SPAN port, also referred to as a mirror port, receives a copy of network traffic from an enterprise switch which can then be monitored by an analysis device attached to the SPAN port. In another example, operation 200 could be included in a reverse proxy or load balancer used in the provision of a web service, where an active inline security module of web server 130 receives and analyzes network traffic from a plurality of users, such as web client 105, before delivering it to the web service. However, the following description will simply refer to operation 200 as being performed by web server computing system 130 to facilitate this discussion, which may include any of the above monitoring and analysis techniques, among others.

As shown in the operational flow of FIG. 2, web server computing system 130 monitors security information transmitted by web client 105 during Hypertext Transfer Protocol Secure (HTTPS) session establishment between web server 130 and web client 105 (201). Web client 105 could comprise any application that interacts with web server 130, such as a genuine web browser, mobile application, attack tools such as a script or bot, or any other software program. Web server 130 typically provides a web service to web client 105, which could comprise any service that may be available over a communication network, such as streaming media, email, financial services, e-commerce, social media, online gaming services, or any other web service, including combinations thereof. In this example, the HTTPS session being established is both hosted and monitored by server computing system 130, although the HTTPS session could be provided and/or monitored by a different computing system in some implementations. The security information could comprise any data transmitted by web client 105 during HTTPS session establishment, including the content, format, and sequence of messages and/or data fields within the messages, the manner in which web client 105 interacts with web server 130 while establishing the secure session, and any other information associated with web client 105 during HTTPS session establishment. For example, the security information monitored during the HTTPS session establishment between web server 130 and web client 105 typically includes various session configuration data and security parameters, such as protocol versions, session identifiers, cipher suites, compression methods, random values, and any other information provided during secure session setup, including combinations thereof. In some examples, the security information could comprise security parameters included in a client hello message transmitted by web client 105 during HTTPS session establishment. For example, the security information could include a list of cipher suites supported by client 105.

Web server computing system 130 processes header information transmitted by web client 105 to determine a type of web browser associated with client 105 (202). Typically, regardless of whether web client 105 is a genuine browser or a malicious attack tool masquerading as a browser, client 105 will transmit header information with a field that purports to originate from some type of known web browser. For example, web client 105 could transmit a Hypertext Transfer Protocol (HTTP) request header having a User-Agent header field that indicates some known type of web browser. Typically, every well-known web browser exposes the Browser Name, Version, and Platform combination through the User-Agent header field in the HTTP request header. Thus, in some examples, processing the header information transmitted by client 105 could comprise processing the User-Agent header field of the HTTP request header transmitted by client 105 to determine the type of web browser associated with client 105. Note that the type of web browser associated with client 105 could also indicate a particular version of that web browser in some examples. Other information and techniques may be used to determine a type of web browser associated with client 105 and are within the scope of this disclosure.

Web server computing system 130 generates a security signature for client 105 based on the list of cipher suites transmitted by client 105 during the HTTPS session establishment (203). Typically, the security signature for web client 105 describes the unique form and content of any information transmitted by client 105 during HTTPS session establishment, along with the behavior of client 105 when interacting with web server 130 while establishing the secure session. For example, the security information could comprise a list of cipher suites supported by client 105 as discussed above. In this case, which particular cipher suites are listed, the total number or quantity of cipher suites included in the list, the order or sequence in which the cipher suites are presented, and any other attributes of the security information transmitted by client 105 during HTTPS session establishment can be used to generate a unique signature for client 105. The security signature is distinctive for each different type and/or version of legitimate web browser. For example, different web browsers and even different versions of the same web browser may include different cipher suites in the list, and may arrange and order the cipher suites and other security information differently. Essentially, any nuances in the content, manner, and format in which web client 105 presents the security information and parameters during HTTPS session establishment with web server 130 can be used to generate the security signature for client 105, which effectively provides a unique fingerprint of client 105 based on the security information.

Web server computing system 130 compares the security signature for client 105 with a predetermined signature for the type of web browser associated with client 105 to determine if client 105 is a genuine web browser of the type of web browser associated with client 105 (204). Typically, web server 130 may be preconfigured with predetermined signatures for well-known browsers and their various release versions and/or server 130 may be provided with these signatures periodically. Additionally or alternatively, web server computing system 130 could generate these predetermined signatures through observation and store them in a database for use in the comparison. For example, web server 130 could be trained by an administrator sending secure session requests from known genuine web browsers, where web server 130 processes the resulting security information to generate security signatures for these genuine web browsers to use in later comparison with unknown or untrusted clients, such as client 105. In this manner, web server 130 could also be updated with the latest release versions of different browsers. Regardless of the method of acquisition, a predetermined signature of a particular browser can then be used to positively identify future connection requests received from the corresponding browser from which the signature was derived. Thus, if the security signature that is determined for web client 105 matches the predetermined signature for the type of web browser that client 105 purports to be according to its header information, then web server 130 can positively determine that client 105 is a genuine web browser and not a malicious attack tool masquerading as that browser. In some implementations, web server computing system 130 could compare the security signature for client 105 with all available predetermined signatures for every browser version known to server 130 and determine that client 105 is a genuine web browser if the security signature for client 105 matches one of these known signatures, without regard to the type of web browser associated with client 105, which may be unknown or undetermined in some examples. Also, in at least one implementation, predetermined signatures for known malicious attack tools could be similarly generated and compared to the security signature for web client 105 to positively identify client 105 as a particular malicious tool and not a genuine web browser.

Advantageously, web server computing system 130 is able to passively monitor interactions between web client 105 and web server 130 during HTTPS session establishment to generate a security signature for client 105. By comparing similar predetermined signatures for the type of web browser associated with client 105 to the security signature generated for client 105, web server 130 is capable of determining whether client 105 is a genuine or forged web browser. Accordingly, by detecting and eliminating illegitimate requests from forged web browsers, the techniques described herein provide the technical advantage of reducing the load on the processor, network components, and other elements of web server 130, while also safeguarding the information of users of the web service. In this manner, web server 130 can positively identify attempts at web browser forgery and effectively thwart attacks on the web service from these kinds of attack tools.

Figure 3:
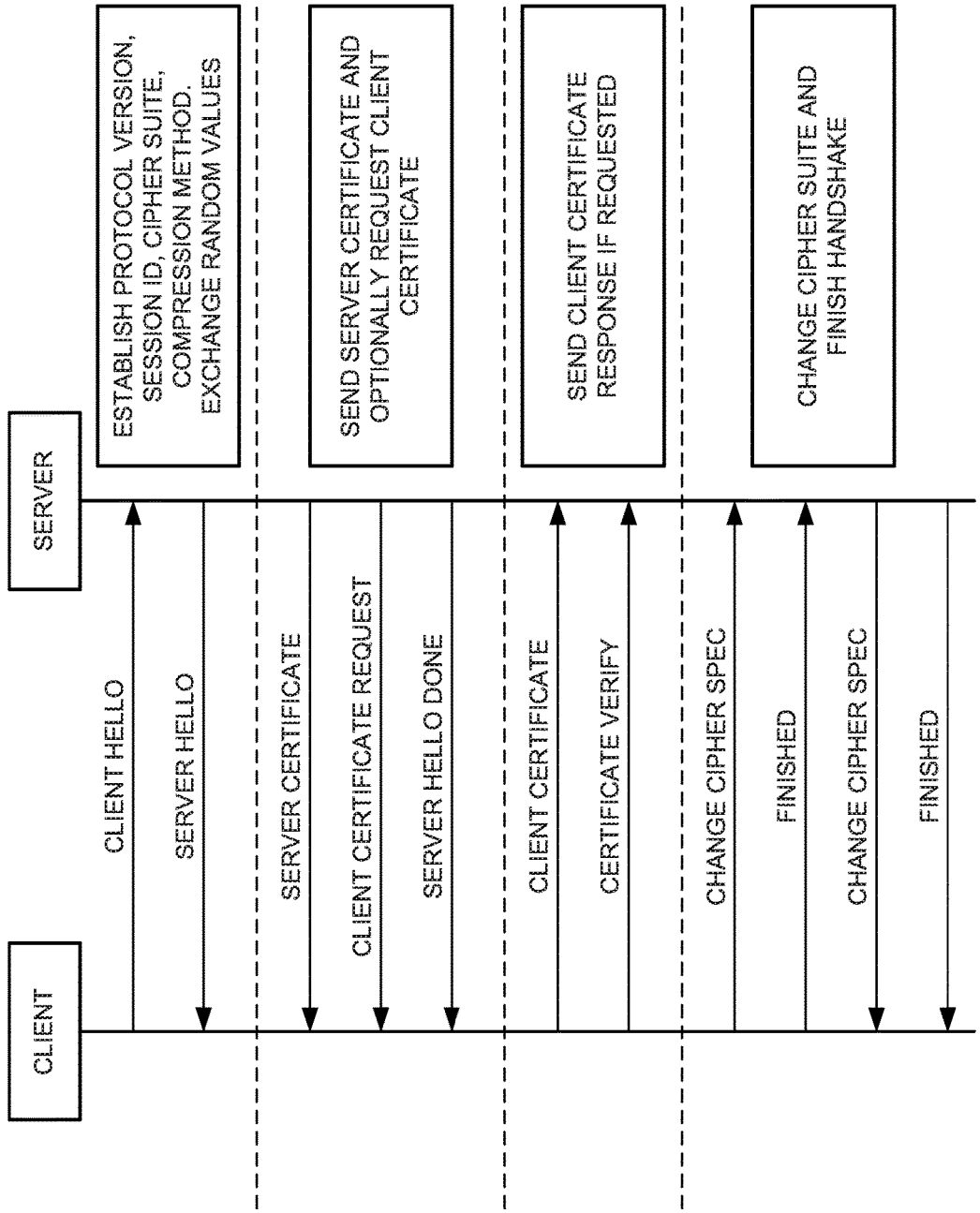
FIG. 3 is a sequence diagram that illustrates exemplary HTTPS session establishment.

Referring now to FIG. 3, a sequence diagram is shown that illustrates a typical HTTPS session establishment. The techniques described in FIG. 3 could be executed by the elements of communication system 100 and could be combined with operation 200 of FIG. 2 in some implementations. In the first phase of the HTTPS connection establishment, the client, which is typically a web browser, sends a secure client hello request to the web server. HTTPS session establishment involves using Secure Socket Layer (SSL) or Transport Layer Security (TLS) to authenticate the client and server which is then used to encrypt messages between the authenticated parties. In this example, the hello request transmitted by the client identifies SSL/TLS protocol versions it supports, includes a session identifier, and lists the supported cipher suites and compression methods, among other security information.

In response to the client hello message, the server sends a server hello message, which includes a selection of a cipher suite from the list of client cipher suites, along with a selected protocol version, compression method, and other configuration options. In addition, random values are exchanged between the server and the client.

In the next phase of HTTPS session establishment, the server sends a server certificate and optionally requests a client certificate. The server then transfers a server hello done message to the client, signifying the end of this phase. In response to the client certificate request, the client transfers a client certificate to the server. The client also transfers a certificate verify message to indicate that the client has verified the server's certificate. The server then verifies the client certificate.

In a final phase of HTTPS connection establishment, the client may send a change cipher spec request to the server, followed by a finished message. The server may then respond to the client's change cipher spec request with a change cipher spec acknowledgement message, at which point the handshake between the client and the server is finished and the HTTPS session is established.

FIGS. 4 and 5 provide some examples of security parameters from web browsers that may be included in the client hello message sent to the server. In particular, FIG. 4 provides exemplary security parameters from a typical modern web browser. Some examples of modern web browsers include Firefox 27, Chrome 22, Opera 14, Safari 7, and Internet Explorer 11. However, note that the list of cipher suites supported by each browser will be different, along with the order that each browser presents the cipher suites in the list. The security information shown in FIG. 5 provides exemplary security parameters associated with a client hello message from an older version of a web browser. Some examples of older versions of web browsers include Firefox 1, Chrome 1, Opera 5, Safari 1, and Internet Explorer 7. In this example, there are a greater number of cipher suites shown in FIG. 5 for the older web browser example than those shown in FIG. 4 for the more modern browser, because in the example of FIG. 5 the older browser includes older cipher suites that may have been deprecated and thus are no longer supported by the more modern browser example of FIG. 4. The security information for the older browser example shown in FIG. 5 also includes an older version of the TLS protocol (TLSv1), which is not supported by the more modern web browser example as shown in FIG. 4.

The different client hello parameters shown in FIGS. 4 and 5 demonstrate the differences in the particular cipher suites listed, the number of cipher suites, the order of the cipher suites, and the other attributes of the client hello message, such as the SSL/TLS protocol versions, RSA key size, Diffie-Hellman (DH) parameter size, elliptical curves, certificate signature, HTTP Strict Transport Security (HSTS), and others. These client hello messages and all of the information provided therein could be included in the security information received by the web server during HTTPS session establishment. The various differing attributes of the client hello message can then be used to generate a unique fingerprint for identifying a particular browser. These signatures are unique for each different type and version of web browser.

Most malicious attackers use automated tools to target web servers. When a web server is HTTPS enabled, the attackers are forced to use HTTPS as well. The security signature of an attack tool will be very different from the security signature of a real web browser. The techniques disclosed herein to generate these unique security signatures can be utilized to differentiate legitimate web traffic from malicious traffic which can then be used to block the malicious traffic before it can cause any harm. In some implementations, a velocity manager maintains a list of valid security signatures for popular web browsers that can be updated periodically. By comparing the received client signature against the signatures in the database, a legitimate client and a malicious client are readily distinguished.

In some examples, a trusted learning environment could be created where the traffic being sent between the computing devices and the web server is controlled. This environment can be used by the web server to automatically learn all of the subtle behavioral differences during HTTPS session establishment for every well-known web browser and its various incremental version releases. In particular, a known web browser to be analyzed is loaded onto a computing device and controlled traffic is exchanged with the web server while monitoring all of the default behavior and data transmissions of the browser while establishing an HTTPS session. In some examples, the information monitored may include the various fields in request headers sent by the browser, including which fields are provided, the order that the fields are presented, which protocols, languages, tools, and other features the browser supports, and any other information in the headers that may be uniquely associated with the web browser. In this manner, all HTTPS session traffic is passively monitored, and these static and dynamic behaviors are then mapped back to the actual web browsers under their respective User-Agent string and stored as a security signature for later comparison. New security information and behavior of new versions of prevalent web browsers are continuously learned in this environment as they are released, ensuring the database remains current, relevant, and effective. New security information of web browsers can also be added to their security signatures as they are learned, which can be observed from the HTTPS session traffic exhibited by the browsers.

In addition to observing the various different web browser interactions, attack tools may also be run in the trusted test environment. In this case, even though the attack tools may be fraudulently manipulating the User-Agent string, this controlled test environment provides for tracking the traffic from the attack tools to learn their behavior and observe how it differs from the genuine web browsers they are pretending to be. This information can aid in identifying when a particular attack tool is being used, which helps strengthen the determination that the traffic is not coming from a genuine web browser. After amassing the data as described above for all well-known web browsers and their various release versions, the system can operate in an untrusted environment with a mixture of real and forged browsers and monitor the clients' behaviors during HTTPS session establishment. Based on these learned behaviors, a determination can be made as to whether or not a purported browser is a genuine browser of the type specified in its User-Agent string. If there is a deviation from the learned behavior as determined by comparing security signatures, that browser can be marked as a forgery.

As newer versions of web browsers are released, changes may be made to the security information included in the client hello message. For example, new ciphers may be added to the cipher suite and some older ones may be deprecated and removed as compared to an older version of a browser. In some cases, a new browser version may be released which has not yet been analyzed and thus no security signature exists for it in the database. In such cases, the cipher suite and other security parameters of the new browser version can be checked and compared to the previous version of the browser to make an educated guess if it is a real, genuine new browser version or a malicious actor purporting to be a new browser version. For example, a threshold amount of deviation or a tolerance level may be set when comparing the security signature from an unknown client to a predetermined signature of a known web browser when determining whether or not the unknown client is genuine to account for these slight variations in the security information.

The security techniques described above help to ensure that a web service is only accessed by legitimate web browsers by passively identifying attempts to access the web service with attack tools masquerading as real browsers. Any suspicious activity that deviates from the predetermined security signatures of known web browsers can be flagged and blocked, thereby providing improved defenses against malicious users.

Now referring back to FIG. 1, computing system 101 comprises a processing system and communication transceiver. Computing system 101 may also include other components such as a user interface, data storage system, and power supply. Computing system 101 may reside in a single device or may be distributed across multiple devices. Examples of computing system 101 include mobile computing devices, such as cell phones, tablet computers, laptop computers, notebook computers, and gaming devices, as well as any other type of mobile computing devices and any combination or variation thereof. Examples of computing system 101 also include desktop computers, server computers, and virtual machines, as well as any other type of computing system, variation, or combination thereof.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, packet networks, local area networks (LAN), metropolitan area networks (MAN), wide area networks (WAN), or other network topologies, equipment, or systems—including combinations thereof. Communication network 120 may be configured to communicate over wired or wireless communication links. Communication network 120 may be configured to use time-division multiplexing (TDM), Internet Protocol (IP), Ethernet, optical networking, wireless protocols, communication signaling, or some other communication format, including combinations thereof. In some examples, communication network 120 includes further access nodes and associated equipment for providing communication services to several computer systems across a large geographic region.

Web server computing system 130 may be representative of any computing apparatus, system, or systems on which the techniques disclosed herein or variations thereof may be suitably implemented. Web server computing system 130 comprises a processing system and communication transceiver. Web server computing system 130 may also include other components such as a router, server, data storage system, and power supply. Web server computing system 130 may reside in a single device or may be distributed across multiple devices. Web server computing system 130 may be a discrete system or may be integrated within other systems, including other systems within communication system 100. Some examples of web server computing system 130 include desktop computers, server computers, cloud computing platforms, and virtual machines, as well as any other type of computing system, variation, or combination thereof. In some examples, web server computing system 130 could comprise a network switch, router, switching system, packet gateway, network gateway system, Internet access node, application server, database system, service node, firewall, or some other communication system, including combinations thereof.

Communication links 121 and 131 use metal, air, space, optical fiber such as glass or plastic, or some other material as the transport medium, including combinations thereof. Communication links 121 and 131 could use various communication protocols, such as TDM, IP, Ethernet, telephony, optical networking, hybrid fiber coax (HFC), communication signaling, wireless protocols, or some other communication format, including combinations thereof. Communication links 121 and 131 could be direct links or may include intermediate networks, systems, or devices.

Referring now to FIG. 6, a block diagram that illustrates computing system 600 in an exemplary implementation is shown. Computing system 600 provides an example of web server computing system 130, although system 130 could use alternative configurations. Computing system 600 could also provide an example of computing system 101, although system 101 could use alternative configurations. Computing system 600 includes processing system 601, storage system 603, software 605, communication interface 607, and user interface 609. Software 605 includes application 606 which itself includes detection process 200. Detection process 200 may optionally be implemented separately from application 606.

Computing system 600 may be representative of any computing apparatus, system, or systems on which application 606 and detection process 200 or variations thereof may be suitably implemented. Examples of computing system 600 include mobile computing devices, such as cell phones, tablet computers, laptop computers, notebook computers, and gaming devices, as well as any other type of mobile computing devices and any combination or variation thereof. Note that the features and functionality of computing system 600 may apply as well to desktop computers, server computers, and virtual machines, as well as any other type of computing system, variation, or combination thereof.

Computing system 600 includes processing system 601, storage system 603, software 605, communication interface 607, and user interface 609. Processing system 601 is operatively coupled with storage system 603, communication interface 607, and user interface 609. Processing system 601 loads and executes software 605 from storage system 603. When executed by computing system 600 in general, and processing system 601 in particular, software 605 directs computing system 600 to operate as described herein for web server computing system 130. Computing system 600 may optionally include additional devices, features, or functionality not discussed herein for purposes of brevity.

Referring still to FIG. 6, processing system 601 may comprise a microprocessor and other circuitry that retrieves and executes software 605 from storage system 603. Processing system 601 may be implemented within a single processing device but may also be distributed across multiple processing devices or sub-systems that cooperate in executing program instructions. Examples of processing system 601 include general purpose central processing units, application specific processors, and logic devices, as well as any other type of processing device, combinations, or variations thereof.

Storage system 603 may comprise any computer readable media or storage media readable by processing system 601 and capable of storing software 605. Storage system 603 may include volatile and nonvolatile, removable and non-removable media implemented in any method or technology for storage of information, such as computer readable instructions, data structures, program modules, or other data. Storage system 603 may be implemented as a single storage device but may also be implemented across multiple storage devices or sub-systems co-located or distributed relative to each other. Storage system 603 may comprise additional elements, such as a controller, capable of communicating with processing system 601. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, processing system 601 loads and executes portions of software 605, such as application 606 and/or detection process 200, to facilitate passive detection of forged web browsers. Software 605 may be implemented in program instructions and among other functions may, when executed by computing system 600 in general or processing system 601 in particular, direct computing system 600 or processing system 601 to monitor security information transmitted by a client during Hypertext Transfer Protocol Secure (HTTPS) session establishment between a web server and the client. Software 605 may further direct computing system 600 or processing system 601 to process header information transmitted by the client to determine a type of web browser associated with the client. Software 605 also directs computing system 600 or processing system 601 to generate a security signature for the client based on the security information transmitted by the client during the HTTPS session establishment. Software 605 further directs computing system 600 or processing system 601 to compare the security signature for the client with a predetermined signature for the type of web browser associated with the client to determine if the client is a genuine web browser of the type of web browser associated with the client.

Software 605 may include additional processes, programs, or components, such as operating system software or other application software. Examples of operating systems include Windows®, iOS®, and Android®, as well as any other suitable operating system. Software 605 may also comprise firmware or some other form of machine-readable processing instructions executable by processing system 601.

In general, software 605 may, when loaded into processing system 601 and executed, transform computing system 600 overall from a general-purpose computing system into a special-purpose computing system customized to facilitate passive detection of forged web browsers as described herein for each implementation. For example, encoding software 605 on storage system 603 may transform the physical structure of storage system 603. The specific transformation of the physical structure may depend on various factors in different implementations of this description. Examples of such factors may include, but are not limited to the technology used to implement the storage media of storage system 603 and whether the computer-storage media are characterized as primary or secondary storage.

In some examples, if the computer-storage media are implemented as semiconductor-based memory, software 605 may transform the physical state of the semiconductor memory when the program is encoded therein. For example, software 605 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 600 is generally intended to represent a computing system with which software 605 is deployed and executed in order to implement application 606, detection process 200, and variations thereof. However, computing system 600 may also represent any computing system on which software 605 may be staged and from where software 605 may be distributed, transported, downloaded, or otherwise provided to yet another computing system for deployment and execution, or yet additional distribution. For example, computing system 600 could be configured to deploy software 605 over the internet to one or more client computing systems for execution thereon, such as in a cloud-based deployment scenario.

Communication interface 607 may include communication connections and devices that allow for communication between computing system 600 and other computing systems (not shown) or services, over a communication network 611 or collection of networks. In some implementations, communication interface 607 receives dynamic data 621 over communication network 611. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 609 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 609. In some examples, user interface 609 could include a touch screen capable of displaying a graphical user interface that also accepts user inputs via touches on its surface. The aforementioned user input devices are well known in the art and need not be discussed at length here. User interface 609 may also include associated user interface software executable by processing system 601 in support of the various user input and output devices discussed above. Separately or in conjunction with each other and other hardware and software elements, the user interface software and devices may provide a graphical user interface, a natural user interface, or any other kind of user interface. User interface 609 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate passive detection of forged web browsers, the method comprising:
monitoring security information transmitted by a client during Hypertext Transfer Protocol Secure (HTTPS) session establishment between a web server and the client, wherein the security information transmitted by the client includes a list of cipher suites supported by the client;
processing header information transmitted by the client to determine a type of web browser associated with the client;
generating a security signature for the client based on the security information transmitted by the client during the HTTPS session establishment, wherein the security signature indicates an order of cipher suites in the list of cipher suites;
comparing the security signature for the client with a predetermined signature for the type of web browser associated with the client; and
determining that the client is not a genuine web browser when at least the order of the cipher suites in the security signature for the client does not match a known order of cipher suites in the predetermined signature for the type of web browser associated with the client.

2. The method of claim 1 wherein generating the security signature for the client based on the security information comprises generating the security signature for the client based on session configuration data and security parameters transmitted by the client during the HTTPS session establishment.

3. The method of claim 1 wherein generating the security signature for the client based on the security information comprises generating the security signature for the client based on which cipher suites are included in the list of cipher suites.

4. The method of claim 1 wherein generating the security signature for the client based on the security information comprises generating the security signature for the client based on a quantity of cipher suites in the list of cipher suites.

5. The method of claim 1 wherein the security information comprises content, format, and sequence of messages and data fields within the security information transmitted by the client during the HTTPS session establishment.

6. The method of claim 1 further comprising developing the predetermined signature from a known genuine web browser by monitoring controlled traffic within a trusted environment between the known genuine web browser and the web server.

7. The method of claim 1 wherein processing the header information received from the client to determine the type of web browser associated with the client comprises processing a User-Agent header field of a Hypertext Transfer Protocol (HTTP) request header transmitted by the client to determine the type of web browser associated with the client.

8. One or more computer-readable storage media having program instructions stored thereon to facilitate passive detection of forged web browsers, wherein the program instructions, when executed by a computing system, direct the computing system to at least:
  monitor security information transmitted by a client during Hypertext Transfer Protocol Secure (HTTPS) session establishment between a web server and the client, wherein the security information transmitted by the client includes a list of cipher suites supported by the client;
  process header information transmitted by the client to determine a type of web browser associated with the client;
  generate a security signature for the client based on security information transmitted by the client during the HTTPS session establishment, wherein the security signature indicates an order of cipher suites in the list of cipher suites;
  compare the security signature for the client with a predetermined signature for the type of web browser associated with the client; and
  determine that the client is not a genuine web browser when at least the order of the cipher suites in the security signature for the client does not match a known order of cipher suites in the predetermined signature for the type of web browser associated with the client.

9. The one or more computer-readable storage media of claim 8 wherein the security information comprises content, format, and sequence of messages and data fields within the security information transmitted by the client during the HTTPS session establishment.

10. The one or more computer-readable storage media of claim 8 wherein the program instructions direct the computing system to generate the security signature for the client based on the security information by directing the computing system to generate the security signature for the client based on session configuration data and security parameters transmitted by the client during the HTTPS session establishment.

11. The one or more computer-readable storage media of claim 8 wherein the program instructions direct the computing system to generate the security signature for the client based on the security information by directing the computing system to generate the security signature for the client based on which cipher suites are included in the list of cipher suites.

12. The one or more computer-readable storage media of claim 8 wherein the program instructions direct the computing system to generate the security signature for the client based on the security information by directing the computing system to generate the security signature for the client based on a quantity of cipher suites in the list of cipher suites.

13. The one or more computer-readable storage media of claim 8 wherein the program instructions direct the computing system to develop the predetermined signature from a known genuine web browser by monitoring controlled traffic within a trusted environment between the known genuine web browser and the web server.

14. The one or more computer-readable storage media of claim 8 wherein the program instructions direct the computing system to process the header information received from the client to determine the type of web browser associated with the client by directing the computing system to process a User-Agent header field of a Hypertext Transfer Protocol (HTTP) request header transmitted by the client to determine the type of web browser associated with the client.

15. An apparatus comprising:
  one or more computer-readable storage media;
  a processing system operatively coupled with the one or more computer-readable storage media; and
  program instructions stored on the one or more computer-readable storage media that, when executed by the processing system, direct the processing system to at least:
    monitor security information transmitted by a client during Hypertext Transfer Protocol Secure (HTTPS) session establishment between a web server and the client, wherein the security information transmitted by the client includes a list of cipher suites supported by the client;
    process header information transmitted by the client to determine a type of web browser associated with the client;
    generate a security signature for the client based on the security information transmitted by the client during the HTTPS session establishment, wherein the security signature indicates an order of cipher suites in the list of cipher suites;
    compare the security signature for the client with a predetermined signature for the type of web browser associated with the client; and
    determine that the client is not a genuine web browser when at least the order of the cipher suites in the security signature for the client does not match a known order of cipher suites in the predetermined signature for the type of web browser associated with the client.

16. The apparatus of claim 15 wherein the security information comprises content, format, and sequence of messages and data fields within the security information transmitted by the client during the HTTPS session establishment.

17. The apparatus of claim 15 wherein the program instructions direct the processing system to generate the security signature for the client based on the security information by directing the processing system to generate the security signature for the client based on session configuration data and security parameters transmitted by the client during the HTTPS session establishment.

18. The apparatus of claim 15 wherein the program instructions direct the processing system to generate the security signature for the client based on the security information by directing the processing system to generate the security signature for the client based on which cipher suites are included in the list of cipher suites.

19. The apparatus of claim 15 wherein the program instructions direct the processing system to generate the security signature for the client based on the security information by directing the processing system to generate the security signature for the client based on a quantity of cipher suites in the list of cipher suites.

20. The apparatus of claim 15 wherein the program instructions direct the processing system to develop the predetermined signature from a known genuine web browser by monitoring controlled traffic within a trusted environment between the known genuine web browser and the web server.

\* \* \* \* \*